United States Patent
Yoo et al.

(10) Patent No.: US 7,688,475 B2
(45) Date of Patent: Mar. 30, 2010

(54) SCANNING APPARATUS AND METHOD OF IDENTIFYING GROUP OF PAPERS CONSTITUTING SINGLE SCAN JOB AND APPARATUS AND METHOD OF DETECTING DOG-EARS OF PAPERS

(75) Inventors: Young-ho Yoo, Yongin-si (KR); Eun-Jin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1587 days.

(21) Appl. No.: 10/948,783

(22) Filed: Sep. 24, 2004

(65) Prior Publication Data

US 2005/0105145 A1    May 19, 2005

(30) Foreign Application Priority Data

Sep. 24, 2003    (KR)    .................. 10-2003-0066323

(51) Int. Cl.
*H04N 1/00* (2006.01)
*H04N 1/04* (2006.01)

(52) U.S. Cl. .................. 358/403; 358/498; 358/496; 358/486; 358/468; 358/474; 358/488; 382/305; 382/306

(58) Field of Classification Search .................. 358/498, 358/474, 471, 400, 496, 468, 403, 486, 488; 399/84, 82, 75, 18, 16, 9; 379/357.01, 355.01, 379/352, 350; 382/305, 306; 355/408
See application file for complete search history.

(56) References Cited

U.S. PATENT DOCUMENTS

| | | | | |
|---|---|---|---|---|
| 5,099,512 | A * | 3/1992 | Shigami et al. | 379/357.01 |
| 5,323,473 | A * | 6/1994 | Lau | 382/175 |
| 5,438,426 | A * | 8/1995 | Miake et al. | 358/403 |
| 5,550,614 | A * | 8/1996 | Motoyama | 399/18 |
| 6,208,436 | B1 * | 3/2001 | Cunningham | 358/474 |
| 6,466,336 | B1 | 10/2002 | Sturgeon et al. | |
| 7,303,191 | B2 * | 12/2007 | Takagi et al. | 271/227 |
| 2003/0190169 | A1 * | 10/2003 | Shibaki | 399/21 |

FOREIGN PATENT DOCUMENTS

| | | |
|---|---|---|
| JP | 05-054120 | 3/1993 |
| JP | 8-172514 | 7/1996 |
| KR | 00246458 | 3/1999 |
| KR | 010009864 | 2/2001 |
| KR | 010027264 | 4/2001 |
| KR | 10-2003-0017739 | 3/2003 |

* cited by examiner

*Primary Examiner*—Cheukfan Lee
*Assistant Examiner*—James A Bonner, Jr.

(57) ABSTRACT

A scanning apparatus to scan and process one or more papers provided on a paper feeder, the scanning apparatus including a scan job identifier to identify one or more separate scan jobs within the papers provided on the paper feeder; and an image information processor to process image information to be stored in one or more separate respective files according to the one or more separate scan jobs.

21 Claims, 11 Drawing Sheets

DOC1   DOC2   DOC3

SCANNING APPARATUS AND METHOD OF IDENTIFYING GROUP OF PAPERS CONSTITUTING SINGLE SCAN JOB AND APPARATUS AND METHOD OF DETECTING DOG-EARS OF PAPERS

CROSS-REFERENCE TO RELATED APPLICATIONS

This application claims the benefit of Korean Patent Application No. 2003-66323, filed on Sep. 24, 2003, in the Korean Intellectual Property Office, the disclosure of which is incorporated herein in its entirety by reference.

BACKGROUND OF THE INVENTION

1. Field of the Invention

The present invention relates to a scanning apparatus, and, more particularly, to a scanning apparatus and method of identifying a plurality of papers constituting a single scan job, and an apparatus and method of detecting dog-ears on each paper.

2. Description of the Related Art

As digital technology advances, many apparatuses for transmitting/receiving image information, other than mere voice information, have been developed. Especially, facsimile apparatuses for transmitting/receiving image information of paper data using a Public Switching Telephone Network (PSTN) are widely used. Facsimile apparatuses have been improved to incorporate printing and scanning apparatuses for transmitting/receiving image information over various kinds of network channels. Furthermore, brand new Office Automation (OA) apparatuses, such as a digital multifunction apparatus incorporating a facsimile apparatus, a printer, and a scanner, are widely used due to rapid advances in personal computers and a rise in diffusion rate.

These OA apparatuses can be shared over a network so that one OA apparatus can be used by a plurality of outer apparatuses (Network Scanning). In addition, OA apparatuses can convert image information acquired from scanned paper into computer files and store them (Scan-to-File), and can attach the image information from a scanner directly into an e-mail and send it.

FIG. 1 depicts a conventional scanner 100. The scanner according to the conventional art includes a paper feeder 110 on which a plurality of papers 120 are supplied, a pickup roller 130 picking up each of the supplied papers, a CCD module 150 detecting image information from each paper conveyed on a conveyor roller, and an exit roller 160 for pushing these papers out. When the scanner 100 supports a duplex mode, the paper whose image information is read by the CCD module 150 can be transferred in a direction [A] so that image information on the other side of the paper can be read, or the paper can be transferred in a direction [B] to be exited. The image information read from the CCD module 150 can be transmitted to a central processor (not shown) to be stored in a computer file or attached to an e-mail.

Image information of a plurality of papers read from the CCD module 150 can be stored as a single file. When image information of a plurality of papers is stored as a single file, a subsequent processing such as attaching to an e-mail is facilitated since image information corresponding to a respective sheet of papers constituting an identical scan job is stored in one file, instead of being processed in separate files. Thus, a user's convenience is enhanced. For example, considering a single scan job including ten pages of paper, the alignment of the respective pages can be changed and some files can be lost during subsequent processing when the image information corresponding to the respective pages is stored in ten respective files. On the other hand, when the image information corresponding to ten pages of paper is stored in a single file, the image information of the respective pages is managed as a whole. The term 'scan job' means scanning of a single document comprising a plurality of pages.

FIGS. 2A and 2B depict the output of processing documents constituting a plurality of scan jobs in a scanner according to the conventional art. Documents in FIG. 2A include a first scan job DOC1 comprising a first page DOC1_PG1 through a fourth page DOC1_PG4, a second scan job DOC2 comprising a first page DOC2_PG1 through a seventh page DOC2_PG7, and a third scan job DOC3 comprising a first page DOC3_PG1 through a ninth page DOC3_PG9. When the first through third scan jobs (DOC1, DOC2, DOC3) are provided on the paper feeder 110 and scanned together at the same time, all papers constituting the first through third scan jobs (DOC1, DOC2, DOC3) are processed as a single scan job and stored in a single file. This single file will include all of the papers placed together on the paper feeder 110. FIG. 2B shows an output file of processing the first through third scan jobs (DOC1, DOC2, DOC3), which are identified as a single scan job. As depicted in FIG. 2B, image information of papers identified as a single scan job is stored in a single file, which has one file header.

In conventional scanners, it is cumbersome to wait until respective scan jobs will be finished and then proceed to subsequent scan jobs since all papers provided on a paper feeder are identified as a single scan job and processed all at a time. Therefore, in the case in which all papers for a plurality of scan jobs are loaded on a paper feeder for efficiency of the scan jobs, a scanner which identifies respective scan jobs, and stores image information of papers constituting respective scan jobs separately, is required. When the scanner can identify respective scan jobs and process the scan jobs separately, efficiency is improved since all papers for a plurality of scan jobs can be provided on the paper feeder at the same time.

SUMMARY OF THE INVENTION

It is an aspect of the present invention to provide a scanning apparatus and a method of identifying papers constituting a single scan job among a plurality of papers provided on a paper feeder, in order to store image information of the papers constituting the single scan job in a single file.

Another aspect of the present invention is to provide a scanning apparatus and a method of reading and processing identification information to identifying papers constituting a single scan job among a plurality of papers provided on a paper feeder simply from each of the papers themselves, rather than from a separate information storage medium.

Still another aspect of the present invention is to provide a dog-ear detecting apparatus and method of determining whether there is a dog-ear on a paper provided on a paper feeder.

Additional aspects and/or advantages of the invention will be set forth in part in the description which follows and, in part, will be obvious from the description, or may be learned by practice of the invention.

According to an aspect of the present invention, there is provided a scanning apparatus to scan and process one or more papers provided on a paper feeder, the scanning apparatus comprising an image information reader to read image information from the one or more papers provided on the paper feeder, an image information storage to store the image information, a scan job identifier to detect identification information to identify one or more separate scan jobs within the papers provided on the paper feeder, and an image information processor to receive the identification information from the scan job identifier and process the image information to be stored in one or more separate respective files according.

According to another aspect of the present invention, there is provided a method of processing, as one or more separate files, image information read from a plurality of papers provided on a paper feeder to be stored in the one or more separate respective files according to one or more separate scan jobs, the method comprising detecting a paper provided on the paper feeder, driving a motor to pick up the paper, determining whether the paper corresponds to a continuation of a current scan job by detecting identification information identifying the one or more separate scan jobs within the papers provided on the paper feeder, incorporating the image information of the paper into a current file corresponding to the current scan job in response to the paper being determined to correspond to the continuation of the current scan job, storing the image information of the paper as image information corresponding to a new scan job in response to the paper being determined not to correspond to the continuation of the current scan job, and repeating operations of this method in response to another paper existing on the paper feeder.

According to still another aspect of the present invention, there is provided an apparatus to detect a dog-ear on one or more papers provided on a paper feeder of a scanning apparatus, the apparatus comprising a first detector to determine whether a paper is provided at a first predetermined position from the paper feeder, and a second detector to determine whether the paper is provided at a second predetermined position located at a left or right side of the paper, the second detector being offset by a predetermined distance from the first detector in the direction of the paper, wherein a first detect signal from the first detector is compared with a second detect signal from the second detector to detect whether the dog-ear exists on the paper.

According to still another aspect of the present invention, there is provided a method of detecting a dog-ear on one or more papers provided on a paper feeder of a scanning apparatus, the method comprising receiving a first detect signal from a first detector to indicate whether a paper is provided from the paper feeder at a first predetermined position, receiving a second detect signal from a second detector to indicate whether the paper is provided from the paper feeder at a second predetermined position located at a left or right side of the paper, the second detector being offset by a predetermined distance from the first detector in the direction of the paper, comparing the first detect signal and the second detect signal to determine whether the dog-ear exists on the paper.

The scanning apparatus and method according to the present invention improves efficiency since the scanning apparatus automatically identifies scan jobs using simple identification information and stores image information of respective scan jobs in separate files even when a plurality of papers constituting plurality of scan jobs are loaded on a paper feeder at a time.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
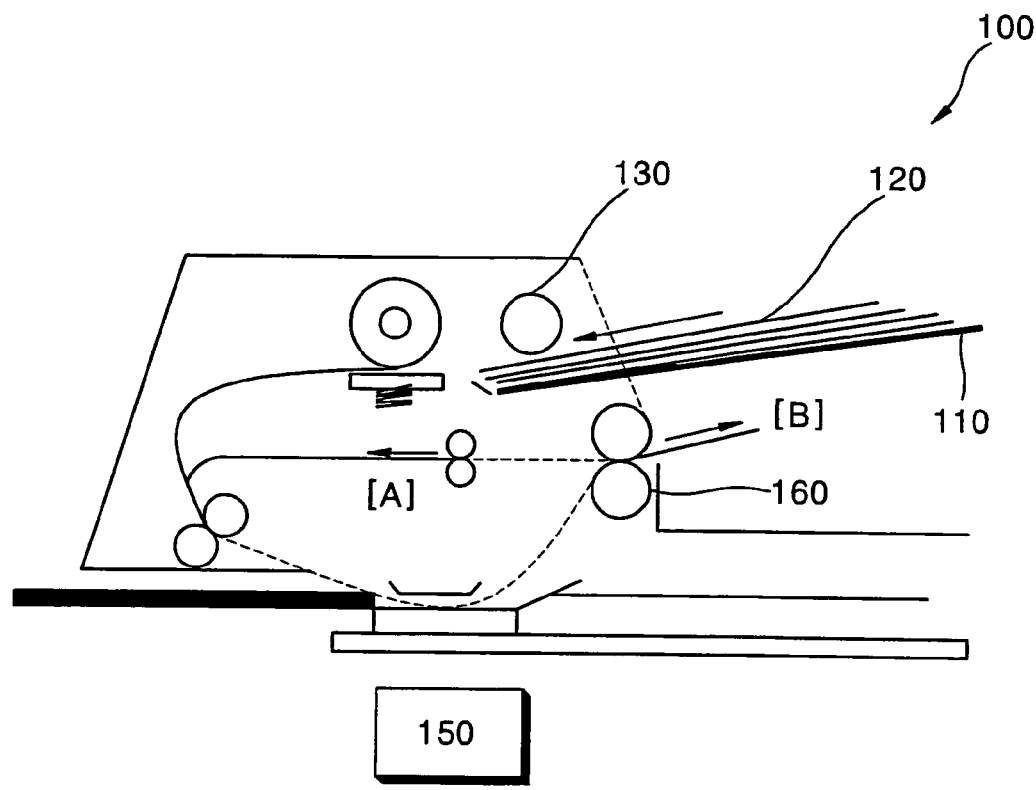
FIG. 1 illustrates a scanning apparatus according to the conventional art.
Figure 2A:
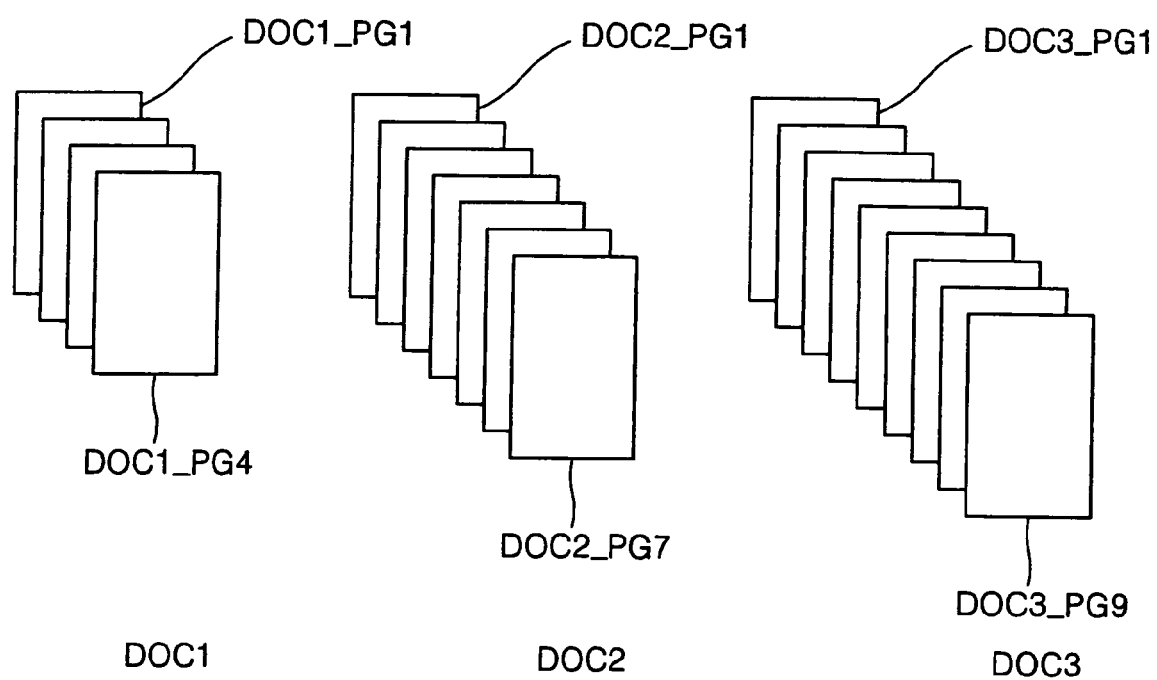
FIGS. 2A and 2B illustrate an output result of papers constituting a plurality of scan jobs of a conventional scanning apparatus respectively.
Figure 2B:
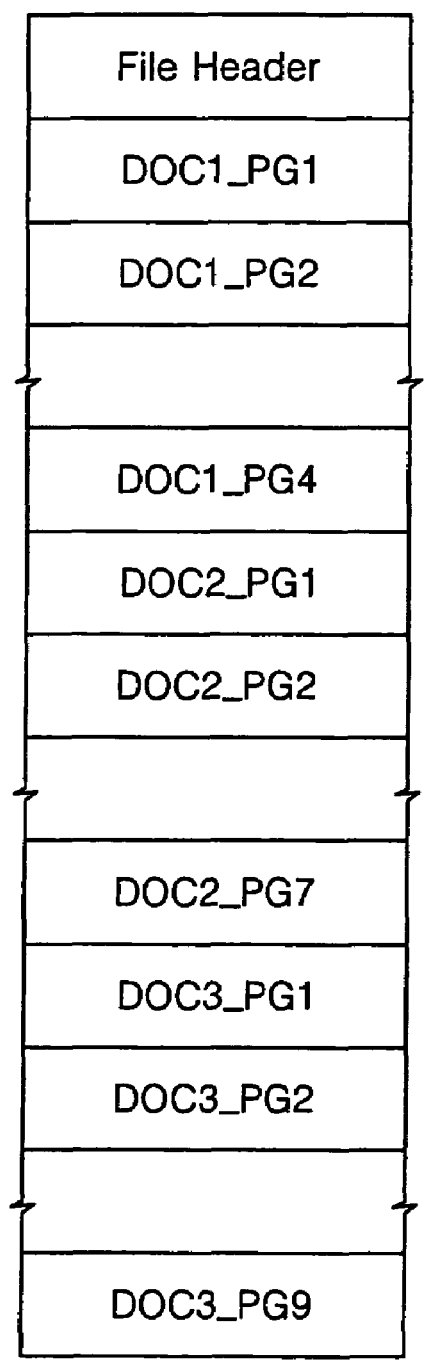

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
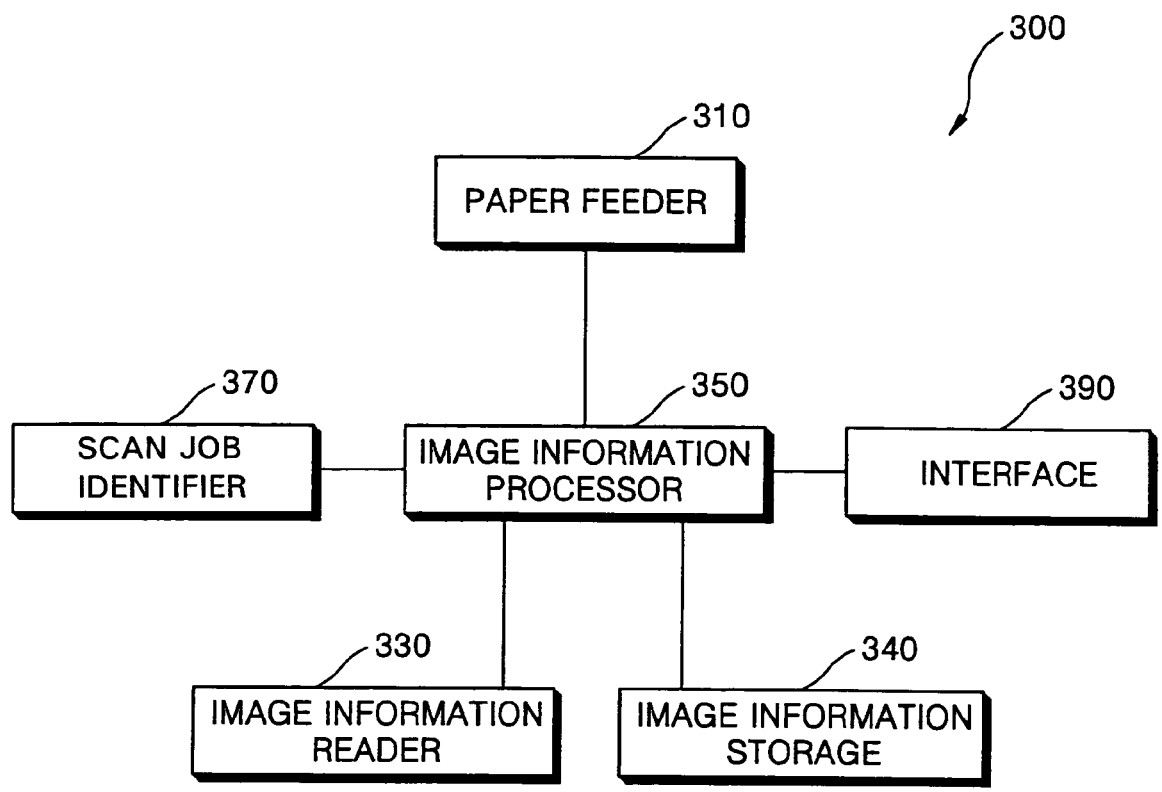
FIG. 3 is a block diagram illustrating a scanning apparatus 300 to identify a group of papers constituting a single scan job according to one embodiment of the present invention.

FIG. 3 is a block diagram depicting a scanning apparatus 300 to identify a group of papers constituting a single scan job according to one embodiment of the present invention. The scanning apparatus 300 shown in FIG. 3 includes a paper feeder 310, an image information reader 330, an image information storage 340, an image information processor 350, a scan job identifier 370, and an interface 390. Papers provided on the paper feeder 310 are conveyed by a conveyor roller (not shown) to the image information reader 330. The image information reader 330 reads image information from the transferred papers and stores the read image information in the image information storage 340. During the transfer, the scan job identifier 370 detects identification information to identify a group of papers constituting a single scan job. The term 'single scan job' refers to the scanning of a single document including a plurality of pages.

Identification information represents whether the paper from which the image information is scanned constitutes a portion of a predetermined scan job. The image information processor 350 receives the identification information from the scan job identifier 370, stores the scanned image information in the predetermined scan job when it is determined that the read paper constitutes a portion of the predetermined scan job, and stores the scanned image information in a new file corresponding to a new scan job when it is determined that the read paper does not constitute a portion of the predetermined scan job. The image information processed by the image information processor 350 is transmitted to an outer device (not shown) over a predetermined network by the interface 390.

The scan job identifier 370 of the scanning apparatus 300 according to an embodiment of the present invention preferably, though not necessarily, reads identification information which is marked on the paper itself provided on the paper feeder 310. It is also possible that identification information is provided by a separate medium, such as on a separate punched paper. However, malfunction may be prevented, and operation speed may be improved, when the identification information is marked on the paper itself instead of using another medium, since not only the manufacturing cost is reduced but also the operation of the scanning apparatus 300 is simplified.

The identification information can be represented depending on the existence of paper deformations such as dog-ears on the top or bottom portion of the paper provided on the paper feeder 310. Other detectable paper deformations may be readily used as the identification information, and it is understood that dog-ears are merely one example of these paper deformations. Embodiments in which the identification information is represented depending on the existence of dog-ears on the top or bottom portion of the paper will be described in detail in corresponding sections of this specification.

In some papers, a portion of the image information on the paper can be lost when top or bottom corners are folded. In this situation, sheets of separation paper can be provided to represent the identification information. In some cases, the identification information itself can be represented as image information on the separation paper. However, not only a reading operation can get complicated but also the operation speed can be slowed down since the image information should be scanned from the separation paper and interpreted. So, the identification information is preferably, though not necessarily, represented as the separation paper itself, which is a sheet of blank paper, instead of being represented on the separation paper. When the separation paper appears, the scan job identifier 370 notifies the image information processor 350 that there is no image information on the separation paper. Then, the image information processor 350 determines that the paper which immediately preceded the separation paper was the last paper of the predetermined scan job and terminates the predetermined scan job to close the file corresponding to the predetermined scan job. The image information processor 350 also determines that a new scan job begins from the paper immediately following the separation paper, and opens a file corresponding to the new scan job.

Although a plurality of papers provided on the paper feeder 310 may be scanned at once by the scanning apparatus 300 according to this embodiment of the present invention, the image information of respective pages is not stored in one file, but in separate files corresponding to separate respective scan jobs.

Figure 4:
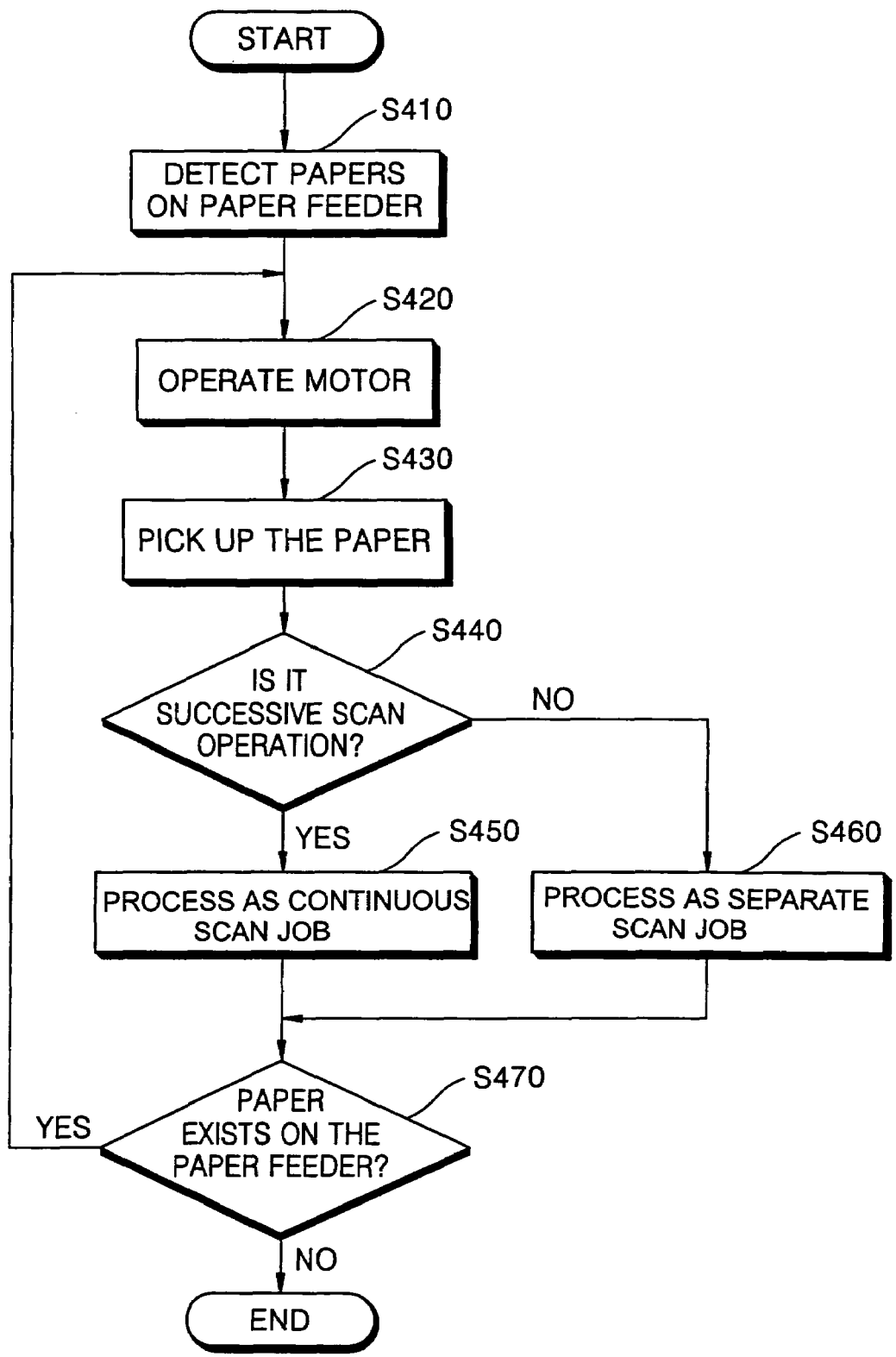
FIG. 4 is a flow chart view illustrating a scanning method of identifying and processing a group of papers constituting a single scan job according to an embodiment of the present invention.

FIG. 4 is a flow chart illustrating a scanning method of identifying and processing a group of papers constituting a single scan job according to another embodiment of the present invention. The method according to this embodiment of the present invention includes a paper detecting operation S410, a drive motor operating operation S420, a paper pickup operation S430, a scan job determination operation S440, a continuous scan job processing operation S450, a separate scan job processing operation S460, and a repetition operation S470.

At first, papers loaded on a paper feeder are detected. Then, a drive motor is initiated (S420), and a pickup roller picks up the papers (S430). The papers picked up by the roller are conveyed by a conveyor roller to a CCD module.

Then, identification information identifying a group of papers constituting a single scan job is received from the conveyed paper to determine whether the paper corresponds to a continuation of a predetermined scan job (S440). The identification information can be represented depending on the existence of paper deformations such as dog-ears on the top or bottom portion of the paper as described above. Similarly, the identification information can be represented using a separation paper as noted above.

When it is determined at the scan job determination operation S440 that the paper corresponds to a continuation of the predetermined scan job, the image information of the paper is included in the file corresponding to the predetermined scan job (S450). When it is determined at the scan job determination operation S440 that the paper does not correspond to a continuation of the predetermined scan job, the image information of the paper is stored in a new file corresponding to a new scan job (S460).

After the image information is processed at the continuous scan job processing operation S450 or the separate scan job processing operation S460, it is additionally determined whether there are more sheets of paper on the paper feeder. When there is a sheet of paper left on the paper feeder, operations beginning with the drive motor operating operation S420 are repeated. The image information of the group of papers constituting a single scan job is stored automatically in one file by the continuous scan job processing operation S450 or the separate scan job processing operation S460. The files separately created for separate respective scan jobs can be used in many applications, such as a scan-to-email mode, as noted above.

Figure 5:
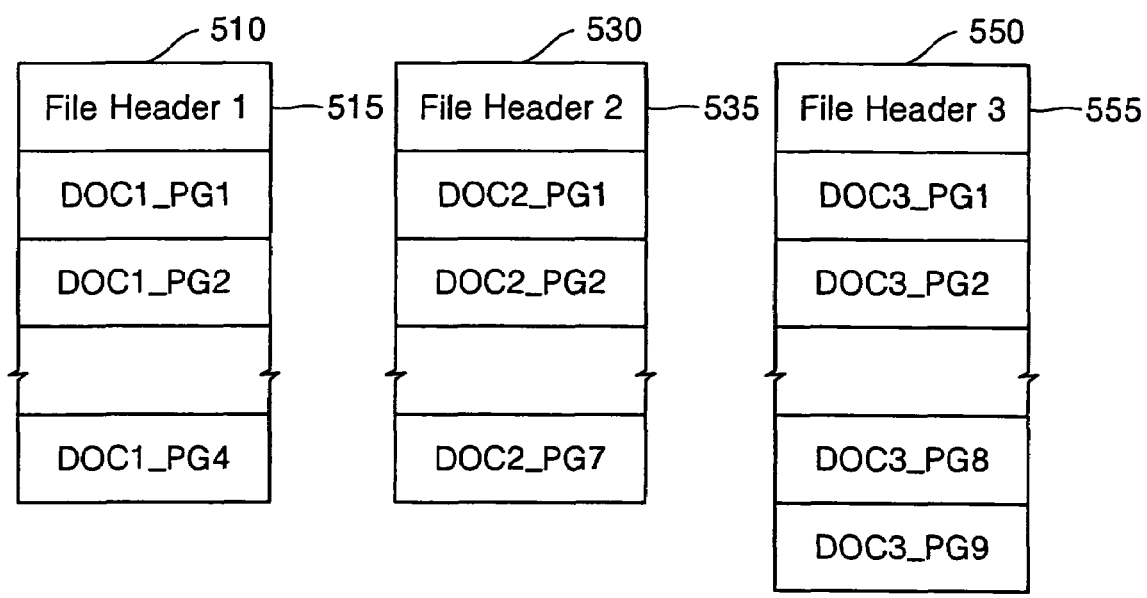
FIG. 5 illustrates processing an output result of papers constituting a plurality of scan jobs by the scanning apparatus and method according to embodiments of the present invention.

FIG. 5 illustrates processing an output result of papers constituting a plurality of scan jobs by the scanning apparatus and method according to embodiments of the present invention.

As shown in FIG. 5, the image information of the first scan job DOC1, comprising the first page DOC1_PG1, and the second page DOC 1_PG2 through the fourth page DOC1_PG4, is stored in the first file 510 having the first file header 515 (File Header 1). The image information of the second scan job DOC2, comprising the first page DOC2_PG1, and the second page DOC2_PG2 through the seventh page DOC2_PG7, is stored in the second file 530 having the second file header 535 (File Header 2). And the image information of the third scan job DOC3, comprising the first page DOC3_PG1, and the second page DOC3_PG2 through the ninth page DOC3_PG9, is stored in the third file 550 having the third file header 555 (File Header 3). The scanning apparatus and method according to embodiments of the present invention stores image information constituting single scan jobs in separate files.

Figure 6A:
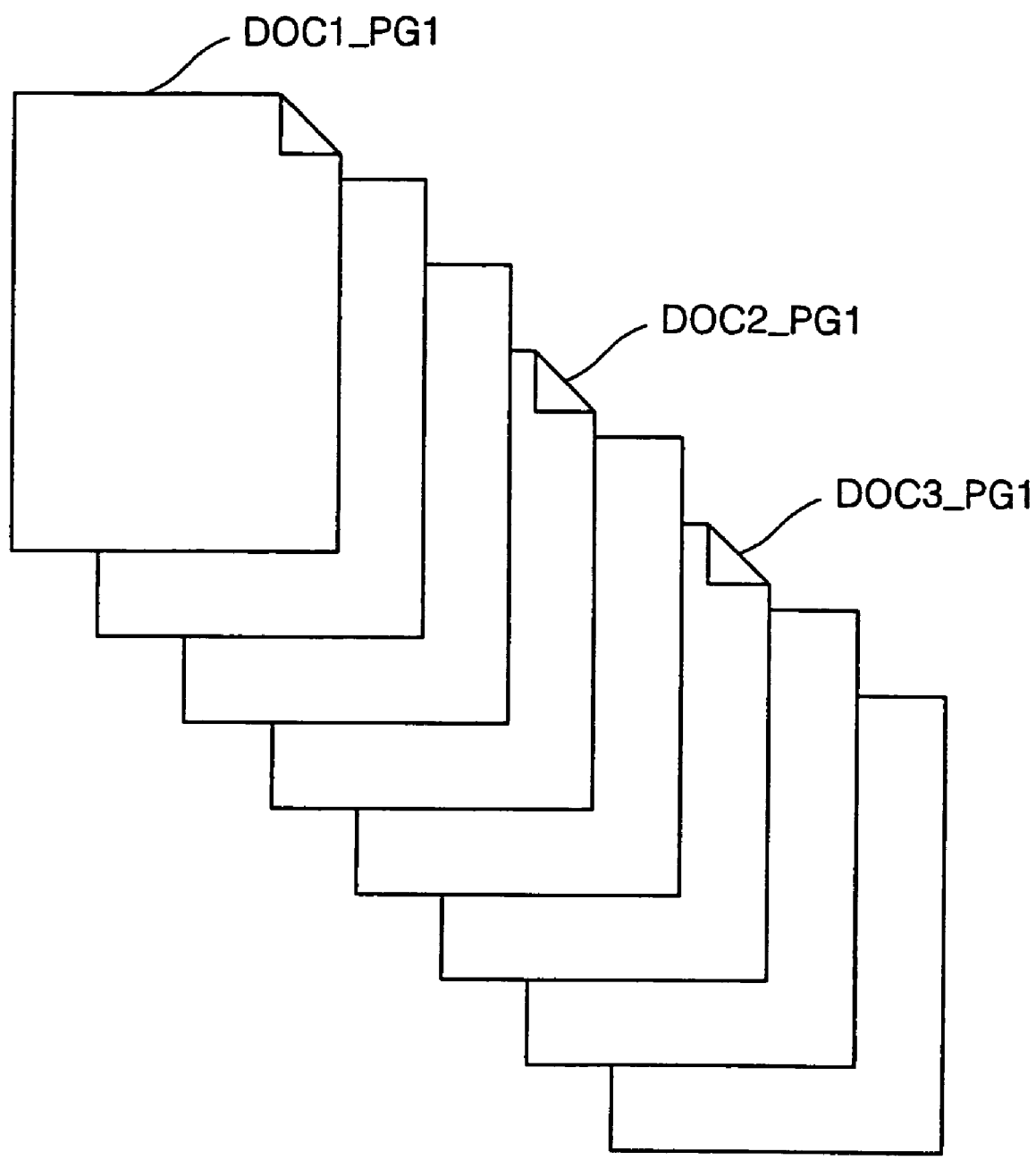
FIG. 6A illustrates documents having identification information to identify a single scan job represented as dog-ears on top of each of the papers.

FIG. 6A illustrates documents having identification information to identify a single scan job represented as dog-ears on top of each of the papers.

It can be seen that the first page of the first scan job DOC1_PG1, the first page of the second scan job DOC2_PG1, and the first page of the third scan job DOC3_PG1 among the illustrated papers have dog-ears on their top right portions. The pages having dog-ears on their top right portions correspond to start pages of new scan jobs. That is, it can be seen from FIG. 6A that there are three pages which constitute the first scan job, two pages which constitute the second scan job, and two pages which constitute the third scan job. In the scanning apparatus and the method according to this embodiment of the present invention, documents from the first pages of the respective scan jobs (DOC1_PG1, DOC2_PG1, DOC3_PG1) to those immediately preceding the first page of the next scan job constitute single scan jobs. For example, a new scan job (first scan job) is determined to begin when the first page of the first scan job (DOC_PG1) is detected. The image information of the following 2 pages is stored in the file corresponding to the predetermined scan job (first scan job), since there are no dog-ears detected on those papers. A dog-ear is then detected on the first page of the second scan job (DOC_PG1). Then, the scanning apparatus and method according to this embodiment of the present invention identifies that the paper immediately before the first page of the second scan job (DOC2_PG1) was the last page of the previous scan job (the first scan job), and closes the file corresponding to the first scan job. In addition, a new file, in which the first page of the second scan job (DOC2_PG1) is stored, is opened.

Figure 6B:
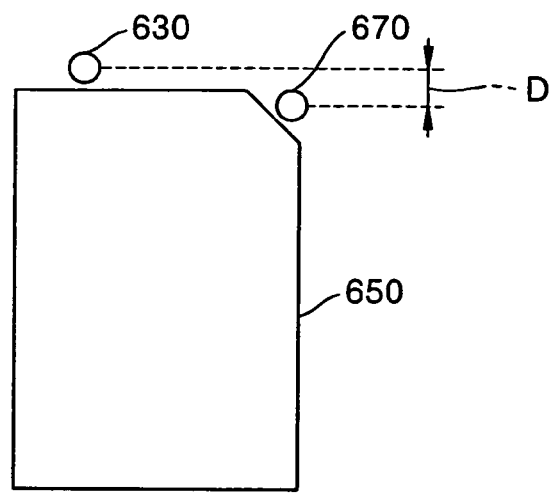
FIG. 6B illustrates first and second detectors to detect the dog-ear on top of the papers shown in FIG. 6A.

FIG. 6B illustrates first and second detectors to detect the dog-ear on top of the papers shown in FIG. 6A.

The first detector 630 shown in FIG. 6B is located at a predetermined position within the width of the paper 650. The second detector 670 is provided with a predetermined spacing D from the first detector 630 in the direction of the paper 650. And, the second detector 670 is located near the right side of the paper 650 in order to detect dog-ears on the paper 650. The paper 650 shown in FIG. 6B includes a dog-ear on the top-right portion, so the second detector 670 is located near the top-right portion of the paper. It will be apparent that the second detector 670 can be located on the top-left portion of the paper 650 when the paper 650 includes a dog-ear on the top-left portion. The reason for the spacing of the first and second detectors 630 and 670 with a predetermined distance is described below.

As described above, it is preferable, though not necessary, to represent the identification information simply by folding one of the corners on the paper or inserting a blank paper between scan jobs, rather than by using a separate medium. Therefore, the second detector 670 is preferably, though not necessarily, offset from the first detector 630 in the direction of the paper 650 in order to facilitate detecting dog-ears. That is, as shown in FIG. 6B, the first detector 630 is activated to detect the existence of a paper when the paper proceeds from lower to upper direction. In the meantime, the second detector 670 fails to detect the existence of the paper since the top-right portion of the paper 650 is folded. So, the second detector 670 is preferably, though not necessarily, spaced from the first detector 630 by a predetermined distance which facilitates the length of the dog-ear. When the second detector 670 is located on the same scan line as the first detector 630, s short dog-ear may not be easily detected.

Figure 6C:
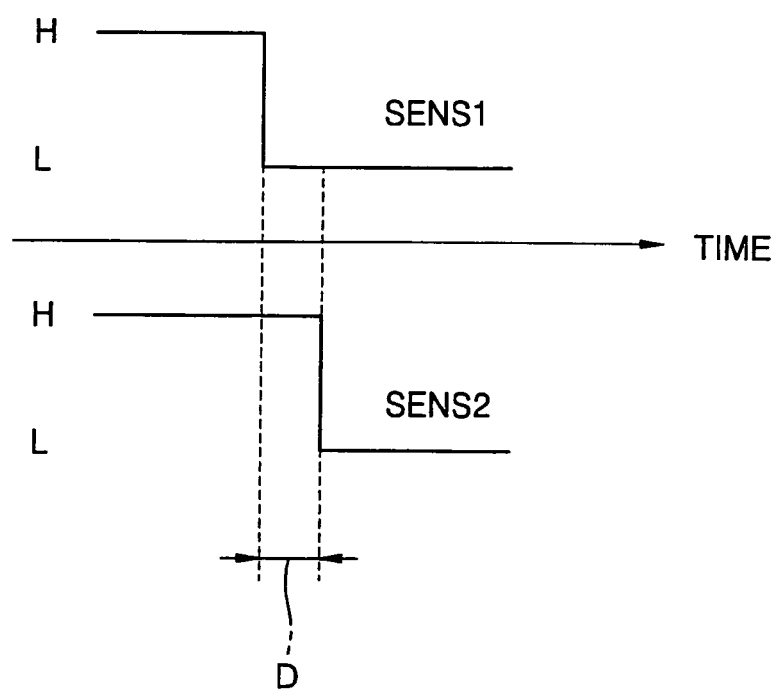
FIG. 6C is a timing diagram of first and second detect signals, which are output from the first and second detectors of FIG. 6B.

FIG. 6C is a timing diagram of first and second detect signals SENS1 and SENS2, which are output from the first and second detectors shown in FIG. 6B. As shown in FIG. 6C, the second detect signal SENS2 is activated later than the first detect signal SENS1 by a predetermined time delay. The time delay corresponds to the time elapsed as the paper proceeds by the predetermined distance between the first detector 630 and the second detector 670 shown in FIG. 6B. In FIG. 6C, it is shown that the first detect signal SENS1 and the second detect signal SENS2 are activated when the signal shifts from logic high to logic low. However, the first detect signal SENS1 and the second detect signal SENS2 can be activated when the signal shifts from logic low to logic high. Therefore, FIG. 6C cannot be understood as a limitation of the scope of the present invention.

Figure 7A:
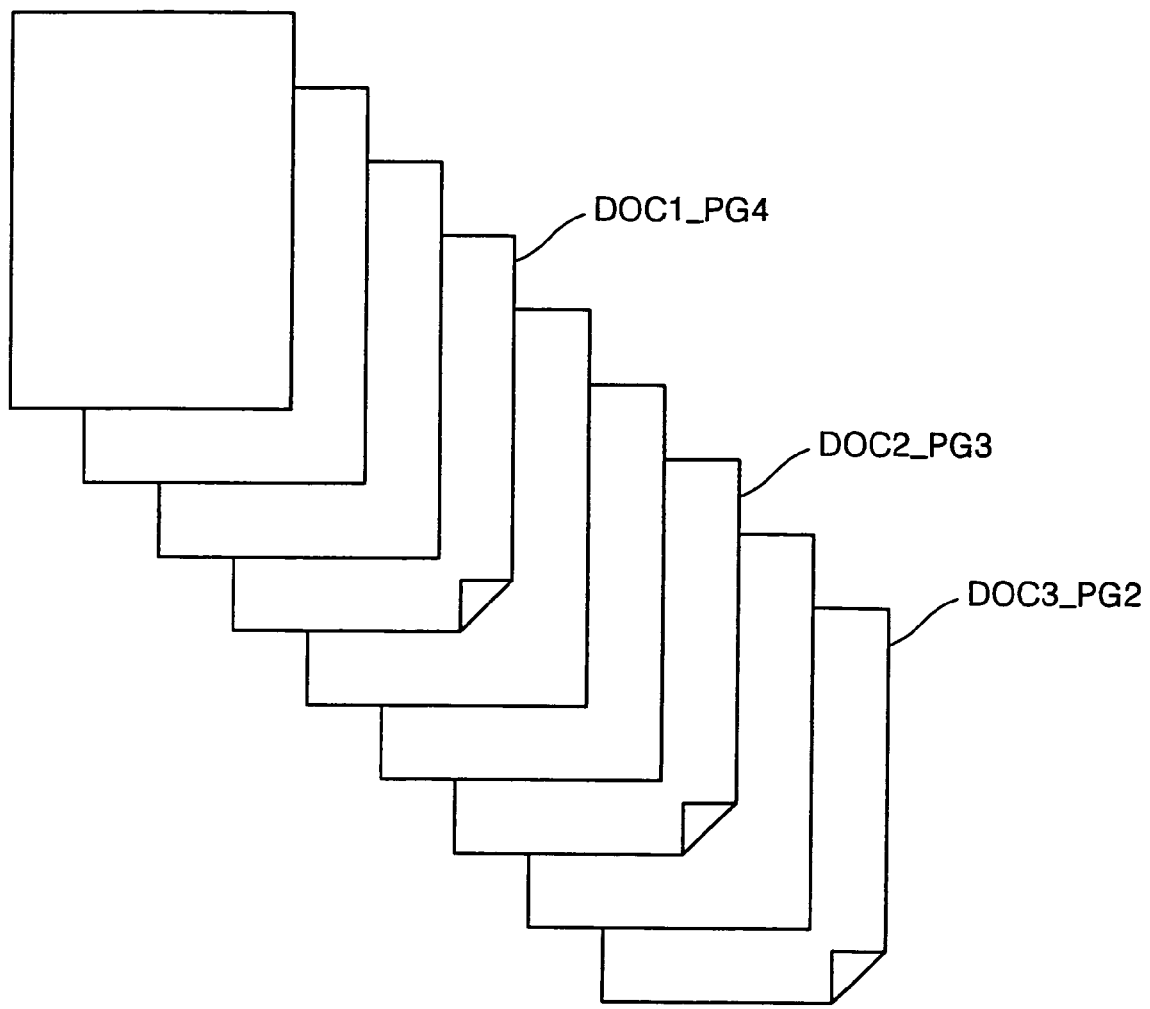
FIG. 7A illustrates documents having identification information to identify a single scan job represented as dog-ears on the bottom of the paper.

FIG. 7A illustrates documents having identification information to identify a single scan job represented as dog-ears on bottom of the paper.

It can be seen that the first page of the first scan job DOC1_PG1, the first page of the second scan job DOC2_PG1, and the first page of the third scan job DOC3_PG1 among the papers illustrated have dog-ears on their bottom right portions. The pages having dog-ears on their bottom right portions correspond to the last pages of pre-stored scan jobs. That is, it can be seen from FIG. 7A that there are four pages which constitute the first scan job, three pages which constitute the second scan job, and two pages which constitute the third scan job. In the scanning apparatus and the method according to this embodiment of the present invention, documents preceding the last pages of respective scan jobs (DOC1_PG4, DOC2_PG3, DOC3_PG2) are collectively determined to constitute single scan jobs. For example, one scan job (first scan job) is determined to end when a bottom-right dog-ear is detected on the forth page of the first scan job (DOC_PG4). Then, it is determined that a new scan job (second scan job) begins from the first page of the second scan job (DOC2_PG1), since there is no dog-ear detected on the page, and a new file corresponding to the new scan job (second scan job) is opened and the image information of the first page of the second scan job (DOC2_PG1) is stored in the file. Similarly, pages which don't contain dog-ears are determined to constitute the second scan job, and the image information of the following paper is added to the file corresponding to the second scan job. Finally, a dog-ear is detected on the third page of the second scan job (DOC2_PG3). Then, the scanning apparatus and method according to this embodiment of the present invention determines that the third page of the second scan job (DOC2_PG3) having a dog-ear is the last paper of the second scan job, and the file corresponding to the second scan job is closed.

Figure 7B:
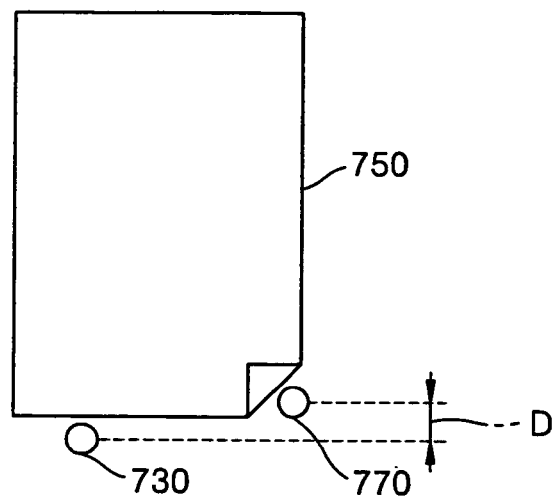
FIG. 7B illustrates first and second detectors to detect the dog-ear on the bottom of the paper shown in FIG. 7A.

FIG. 7B illustrates first and second detectors to detect the dog-ear on bottom of the paper shown in FIG. 7A. The configuration and operation of the first detector 730 and the second detector 770 are similar to those of the first detector 630 and the second detector 670, except that the first detector 730 and the second detector 770 are provided so as to correspond to the bottom portion of the paper 750. So, repeated explanation is omitted for clarity of the application.

Figure 7C:
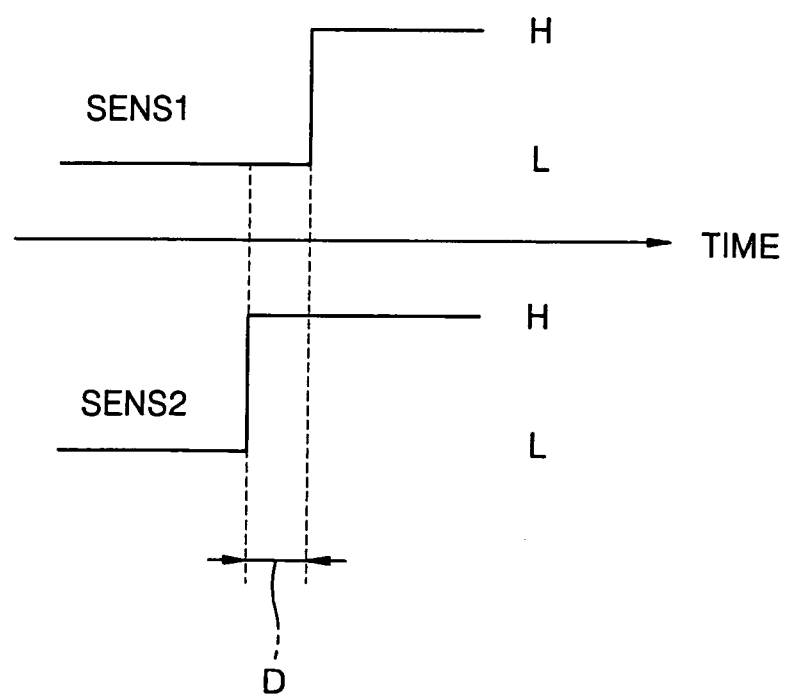
FIG. 7C is a timing diagram of first and second detect signals which are output from the first and second detectors shown in FIG. 7B.

FIG. 7C is a timing diagram of the first and second detect signals SENS1 and SENS2 which are output signals of the first and second detectors 730 and 770 shown in FIG. 7B. As shown in FIG. 7C, the first detect signal SENS1 is activated later than the second detect signal SENS2 by a predetermined time delay. The time delay corresponds to the time elapsed as the paper 750 proceeds by the predetermined distance between the first detector 730 and the second detector 770 shown in FIG. 7B. In FIG. 7C, it is shown that the first detect signal SENS1 and the second detect signal SENS2 are activated when the signal shifts from logic high to logic low, but, as noted above, the first detect signal SENS1 and the second detect signal SENS2 can be activated when the signal shifts from logic low to logic high.

Figure 8:
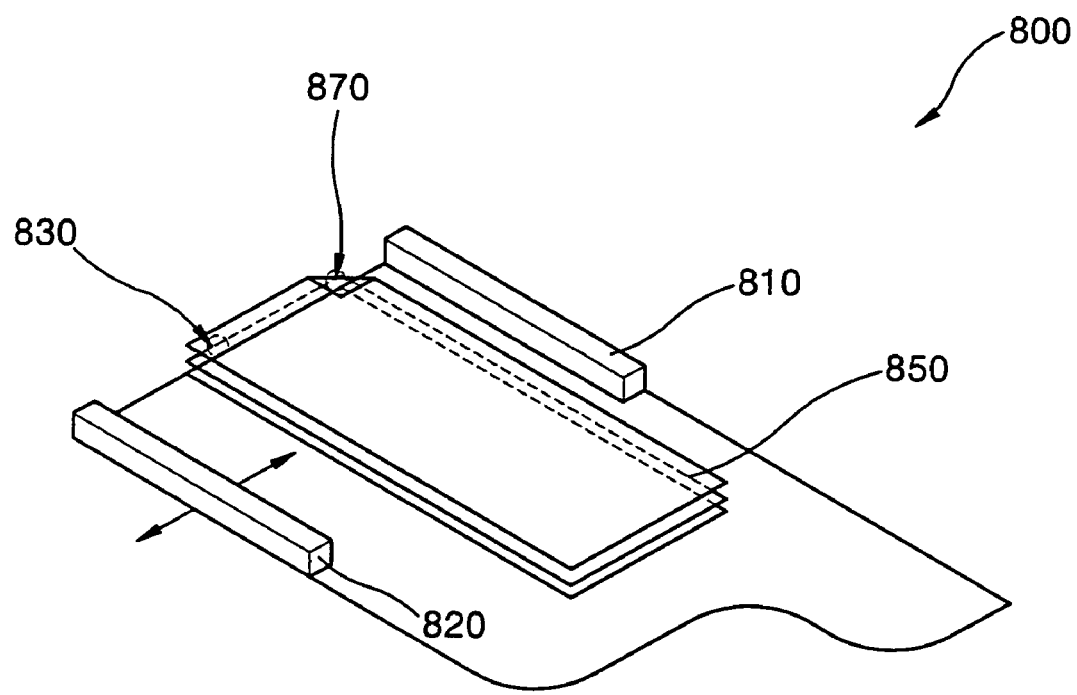
FIG. 8 illustrates an embodiment of the first and second detectors according to an embodiment of the present invention.
Figure 8:
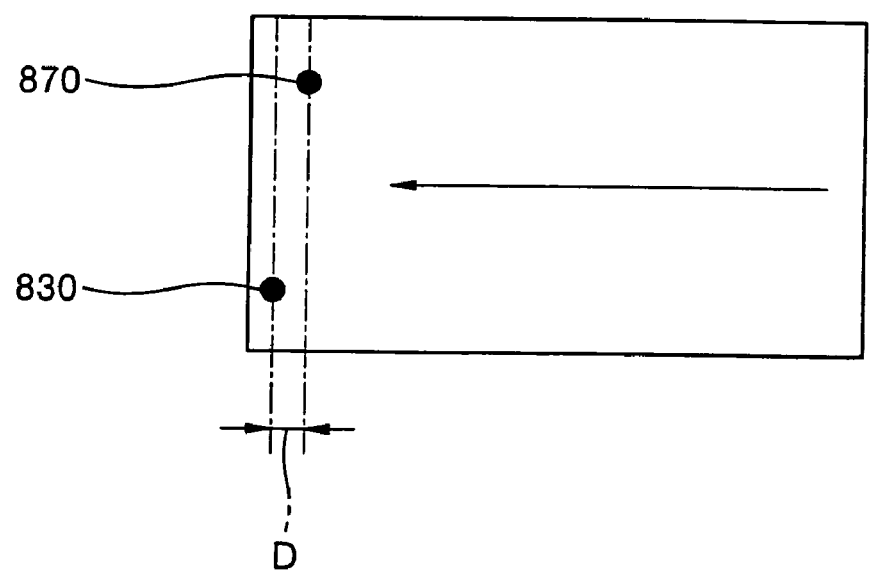

FIG. 8 illustrates an embodiment of the first and second detectors according to an embodiment of the present invention. The first detector 830 and the second detector 870 are provided to detect the top-right dog-ear of the paper 850 when the paper is aligned to the right. Since the paper 850 is aligned to the right, the first guide 810 of the paper feeder 800 is fixed while the second guide 820 is movable to secure the paper 850. Therefore, in the paper feeder 800 shown in FIG. 8, the first detector 830 is fixed in the width of the paper 850, while the second detector 870 is fixed relative to the top right portion of the paper 850. That is, even when the second guide 820 is moved, the first detector 830 detects the paper 850 at a fixed position. As shown above, the first detector 830 and the second detector 870 are preferably, though not necessarily, offset from one another in the direction of the paper 850 by a predetermined distance D.

Figure 9:
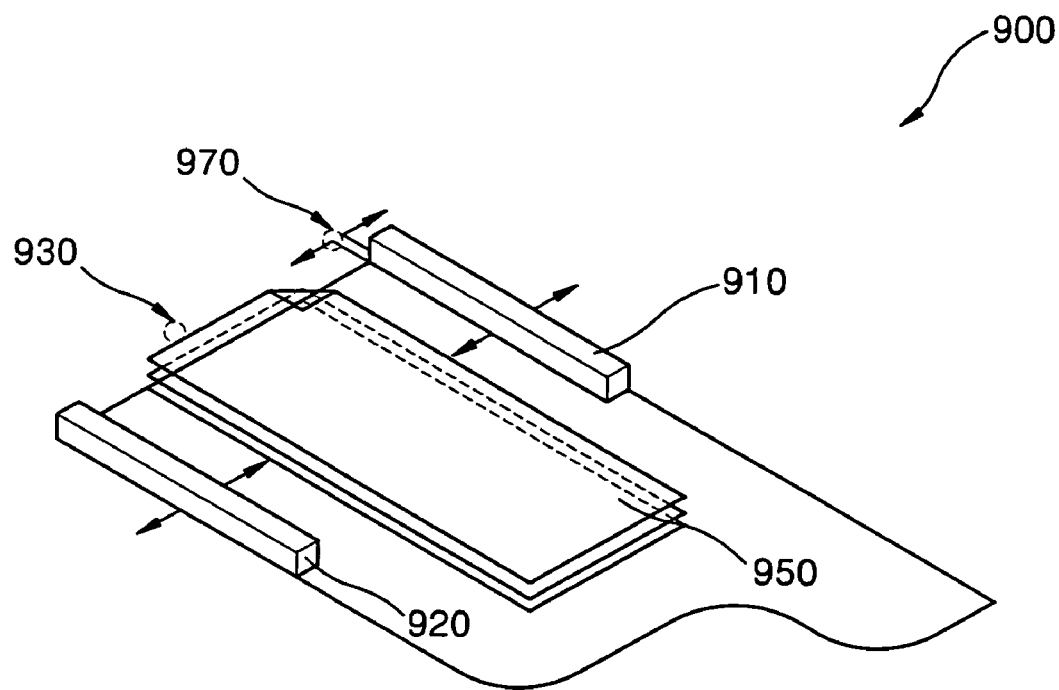
FIG. 9 illustrates another embodiment of the first and second detectors according to another embodiment of the present invention.
Figure 9:
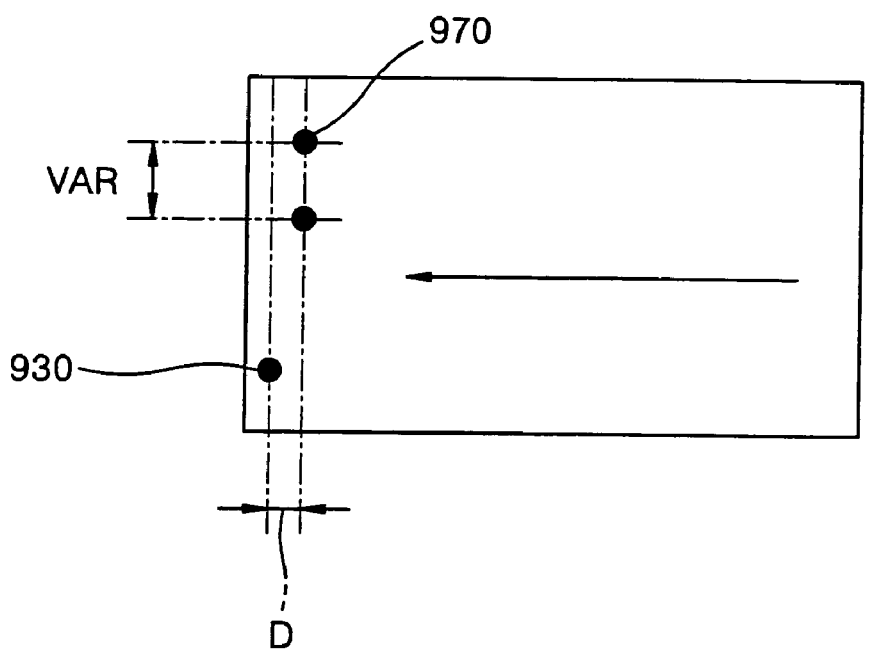

FIG. 9 shows another embodiment of the first and second detectors according to another embodiment of the present invention. The first detector 930 and the second detector 970 shown in FIG. 9 are provided to detect a top-right dog-ear of the paper 950 when the paper is aligned at the center of the paper feeder 900. Since the paper 950 is aligned at the center, the first guide 910 and the second guide 920 are moved relative to each other to secure the paper 950. Therefore, in the paper feeder 900 shown in FIG. 9, the first detector 930 is fixed in the width of the paper 950, while the second detector 970 is provided on the first guide 910 to be moved with the first guide 910. That is, the position of the second detector 970 is varied in a predetermined range VAR as the first guide 910 moves. As shown above, the first detector 930 and the second detector 970 are preferably, though not necessarily, offset from one another in the direction of the paper 950 by a predetermined distance D.

The present invention identifies one or more papers constituting a single scan job from a plurality of papers provided on a paper feeder, and stores image information of the one or more papers constituting the single scan job in respective single files, even when documents constituting different scan jobs are provided simultaneously on the paper feeder.

According to an embodiment of the present invention, the identification information to identify paper constituting a single scan job from a plurality of papers provided on a paper feeder is represented simply by paper deformations such as dog-ears on one or more of the papers, rather than by using a separate medium.

Further, an embodiment of the present invention determines whether there is a dog-ear on any of the papers provided on a paper feeder.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of processing, as one or more separate files, image information read from a plurality of papers provided on a paper feeder to be stored in the one or more separate respective files according to one or more separate scan jobs, the method comprising:

detecting a paper provided on the paper feeder;

driving a motor to pick up the paper;

determining whether the paper corresponds to a continuation of a current scan job by detecting identification information identifying the one or more separate scan jobs within the papers provided on the paper feeder, the identification information represented by whether there is a paper deformation at an edge of any of the one or more papers;

incorporating the image information of the paper into a current file corresponding to the current scan job in response to the paper being determined to correspond to the continuation of the current scan job;

storing the image information of the paper as image information corresponding to a new scan job in response to the paper being determined not to correspond to the continuation of the current scan job; and repeating operations of this method in response to another paper existing on the paper feeder, wherein the determining whether the paper corresponds to a continuation of the current scan job further comprises:

receiving a first detect signal from a first detector detecting the paper provided from the paper feeder, and a second detect signal from a second detector provided so as to correspond with a left or right side of the paper and offset by a predetermined distance from the first detector in the direction of the paper; and identifying the paper as a start paper of the current scan job in response to the first detect signal and the second detect signal being activated sequentially within a predetermined time interval.

2. The method of claim 1, wherein the second detector is movably provided so as to correspond with a left or right side of the paper according to an alignment of the paper so as to detect the paper deformation.

3. The method of claim 1, wherein the paper deformation is a dog-ear of a corner of the paper.

4. A method of processing, as one or more separate files, image information read from a plurality of papers provided on a paper feeder to be stored in the one or more separate respective files according to one or more separate scan jobs, the method comprising:

detecting a paper provided on the paper feeder;

driving a motor to pick up the paper;

determining whether the paper corresponds to a continuation of a current scan job by detecting identification information identifying the one or more separate scan jobs within the papers provided on the paper feeder, the identification information represented by whether there is a paper deformation at an edge of any of the one or more papers;

incorporating the image information of the paper into a current file corresponding to the current scan job in response to the paper being determined to correspond to the continuation of the current scan job;

storing the image information of the paper as image information corresponding to a new scan job in response to the paper being determined not to correspond to the continuation of the current scan job; and repeating operations of this method in response to another paper existing on the paper feeder, wherein the determining whether the paper corresponds to a continuation of the current scan job further comprises:

receiving a first detect signal from a first detector detecting the paper provided from the paper feeder, and a second detect signal from a second detector provided so as to correspond with a left or right side of the paper and offset by a predetermined distance from the first detector in the direction of the paper; and identifying the paper as a last paper of the current scan job in response to the second detect signal and the first detect signal being deactivated sequentially within a predetermined time interval.

5. The method of claim 4, wherein the second detector is movably provided so as to correspond with a left or right side of the paper according to an alignment of the paper so as to detect the paper deformation.

6. An apparatus to detect a dog-ear on one or more papers provided on a paper feeder of a scanning apparatus, the apparatus comprising:
- a first detector to determine whether a paper is provided at a first predetermined position from the paper feeder; and
- a second detector to determine whether the paper is provided at a second predetermined position located at a left or right side of the paper, the second detector being offset by a predetermined distance from the first detector in the direction of the paper;
- wherein a first detect signal from the first detector is compared with a second detect signal from the second detector to detect whether the dog-ear exists on the paper.

7. The apparatus of claim 6, wherein the dog-ear is determined to be at a top of the paper in response to the first detect signal and the second detect signal being activated sequentially within a predetermined time interval.

8. The apparatus of claim 6, wherein the dog-ear is determined to be at a bottom of the paper in response to the second detect signal and the first detect signal being deactivated sequentially within a predetermined time interval.

9. The apparatus of claim 6, wherein the second detector is movable to the left or right side of the paper, according to an alignment of the paper, to detect the dog-ear on the paper.

10. A method of detecting a dog-ear on one or more papers provided on a paper feeder of a scanning apparatus, the method comprising:
- receiving a first detect signal from a first detector to indicate whether a paper is provided from the paper feeder at a first predetermined position;
- receiving a second detect signal from a second detector to indicate whether the paper is provided from the paper feeder at a second predetermined position located at a left or right side of the paper, the second detector being offset by a predetermined distance from the first detector in the direction of the paper; and
- comparing the first detect signal and the second detect signal to determine whether the dog-ear exists on the paper.

11. The method of claim 10, wherein the dog-ear is determined to be at a top of the paper in response to the first detect signal and the second detect signal being activated sequentially within a predetermined time interval.

12. The method of claim 10, wherein the dog-ear is determined to be at a bottom of the paper in response to the second detect signal and the first detect signal being deactivated sequentially within a predetermined time interval.

13. The method of claim 10, wherein the second detector is movable to the left or right side of the paper, according to an alignment of the paper, to detect the dog-ear on the paper.

14. A scanning apparatus to scan and process one or more papers provided on a paper feeder, the scanning apparatus comprising:
- a scan job identifier to identify one or more separate scan jobs within the papers provided on the paper feeder by detecting identification information on at least one of the papers, the identification information being a predetermined paper deformation at an edge of the one or more of the papers; and
- an image information processor to process image information to be stored in one or more separate respective files according to the one or more separate scan jobs,
- wherein the paper deformation is a dog-ear on one or more of the papers.

15. The scanning apparatus of claim 14, wherein the identification information indicating start and/or end points of the separate scan jobs.

16. A scanning apparatus to scan and process one or more papers provided on a paper feeder, the scanning apparatus comprising:
- a scan job identifier to identify one or more separate scan jobs within the papers provided on the paper feeder by detecting identification information on at least one of the papers, the identification information being a predetermined paper deformation at an edge of the one or more of the papers; and
- an image information processor to process image information to be stored in one or more separate respective files according to the one or more separate scan jobs;
- a first sensor to detect a paper presence at a first predetermined point; and
- a second sensor to detect the paper presence at a second predetermined point;
- wherein the paper deformation is detected in response to the first and second sensors detecting the paper presence sequentially within a predetermined time interval.

17. The scanning apparatus of claim 16, wherein the second sensor is offset from the first sensor by a predetermined distance in the direction of the paper.

18. The scanning apparatus of claim 16, wherein the first and second sensors are provided at fixed positions.

19. The scanning apparatus of claim 16, wherein the first sensor is provided at a fixed position, and the second sensor is movably provided to be moved to the right or left side of the papers.

20. A method of processing image information of one or more papers provided on a paper feeder, the method comprising:
- identifying one or more separate scan jobs within the papers provided on the paper feeder by detecting identification information on the papers, the identification information being a predetermined paper deformation at an edge of one or more of the papers; and
- processing image information of the one or more separate scan jobs according to one or more separate respective files,
- wherein the paper deformation is a dog-ear on one or more of the papers.

21. The method of claim 20, wherein the identification information indicates start and/or end points of the separate scan jobs.

* * * * *